(12) United States Patent
Iimori et al.

(10) Patent No.: US 6,293,619 B1
(45) Date of Patent: Sep. 25, 2001

(54) SLIDING ROOF

(75) Inventors: Yasushi Iimori; Akira Kose, both of Aichi-ken (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/543,813

(22) Filed: Apr. 6, 2000

(30) Foreign Application Priority Data

Apr. 14, 1999 (JP) .................................................. 11-107097

(51) Int. Cl.⁷ ...................................................... B60J 10/12
(52) U.S. Cl. ...................................... 296/216.09; 49/490.1
(58) Field of Search ........................ 296/216.06, 216.09; 49/490.1

(56) References Cited

U.S. PATENT DOCUMENTS

| | | | |
|---|---|---|---|
| 4,263,750 | * | 4/1981 | Hein ...................................... 49/490.1 |
| 4,765,677 | * | 8/1988 | Nagata ............................. 296/216.09 |
| 5,538,317 | | 7/1996 | Brocke et al. ........................ 296/216 |
| 5,669,657 | * | 9/1997 | Miyazawa ........................ 296/216.06 |
| 5,702,779 | | 12/1997 | Siebelink, Jr. et al. ................ 428/14 |

FOREIGN PATENT DOCUMENTS

| | | | |
|---|---|---|---|
| 509862 | * | 10/1992 | (EP) ................................. 296/216.09 |
| 62-199525 | | 9/1987 | (JP) . |
| 04-090423 | | 8/1992 | (JP) . |
| 06-297961 | | 10/1994 | (JP) . |

* cited by examiner

Primary Examiner—Dennis H. Pedder
(74) Attorney, Agent, or Firm—Woodcock Washburn Kurtz Mackiewicz & Norris LLP

(57) ABSTRACT

A sliding roof capable of opening/closing an opening window formed in a roof body, including a frame having a raised portion around the outer circumference thereof, a panel attached to the frame, and a weather strip fitted between the raised portion and the panel. The raised portion is provided with a projection with an edge directed to a proximal end side of the raised portion for preventing the weather strip from being pulled apart. The projection is formed by shearing work of the raised portion.

2 Claims, 4 Drawing Sheets

SLIDING ROOF

BACKGROUND OF THE INVENTION

1. Field of the Invention

The present invention relates to a sliding roof capable of closing and opening an opening window formed in a roof body of an automobile.

2. Description of the Related Art

A model that has a sun roof in which an opening window is formed in a roof body and the opening window is opened and closed by a sliding roof is lined up in automobiles. As shown in FIG. 4, a weather strip 5 is mounted around an entire circumference of a panel 4, and a sealing property between the opening window of the sun roof and the panel 4 is kept by the weather strip 5.

The weather strip 5 is shaped into a loop, and is fitted to embrace a frame 1 having a raised portion 2 at its peripheral edge and the panel (glass) 4 mounted and attached onto the frame 1 by an adhesion, as shown in FIG. 5.

In the weather strip 5, a tongue portion 5a projecting from the inner circumferential edge is inserted between the panel 4 and the frame 1 for preventing from being pulled apart.

In order to assemble the sliding roof having such a structure in which the tongue portion projecting from the inner circumferential edge of the weather strip is inserted between the panel and the frame, there are two methods, i. e., to mount on the frame the panel having the outer peripheral edge at which the weather strip is fitted in advance, and to mount the panel on the frame at which the weather strip is fitted in advance while winding up a lip portion 5b clamping the panel 4 in cooperation with the tongue portion 5a, for example, by utilizing a string that has been set in advance in a panel fitting portion.

The former method of these two assembling methods is superior in workability to the latter method. However, in order to enhance the reliability of the sliding roof, in view of the fact that the panel is expanded or shrunken due to a temperature difference, if a room is formed between the panel fitting portion of the frame and the edge portion of the panel, it is impossible to utilize the former method. Nevertheless, the latter method is too complicated in assembling work.

Accordingly, it is possible to take an approach to first mount the frame onto the panel and then mount the weather strip onto the frame to which the panel has been attached. In this case, it is impossible to clamp the tongue portion between the panel and the frame. Accordingly, the weather strip in which the tongue portion is dispensed with has to be used.

In this case, the weather strip is likely to be removed easily. Accordingly, as shown in FIG. 6, a tip end portion of a raised portion 12 of a frame 11 is bent horizontally to provide a retainer portion 7 to thereby prevent a weather strip 15 from being pulled apart even if the weather strip 15 is pulled upwardly.

However, in order to bend and form the tip end portion of the raised portion horizontally, it is difficult to perform the machining work unless a width of the horizontal portion to be bent is enlarged to some extent. As a result, the width of the weather strip 15 has to be enlarged so that an area of a sliding roof 16 is unduly increased. If the sliding roof 16 has a transparent panel, an effective area for the light is reduced.

Also, if the width of the weather strip 15 is enlarged, it is difficult to bend the weather strip 15, which has been extruded, in its corner portion.

SUMMARY OF THE INVENTION

According to the present invention, there is provided a sliding roof capable of opening/closing an opening window formed in a roof body, comprising: a frame having a raised portion around the outer circumference thereof; a panel attached to the frame; and a weather strip fitted between the raised portion and the panel, the raised portion being provided with a projection with an edge directed to a proximal end side of the raised portion for preventing the weather strip from being pulled apart.

DESCRIPTION OF THE PREFERRED EMBODIMENTS

Figure 1A:
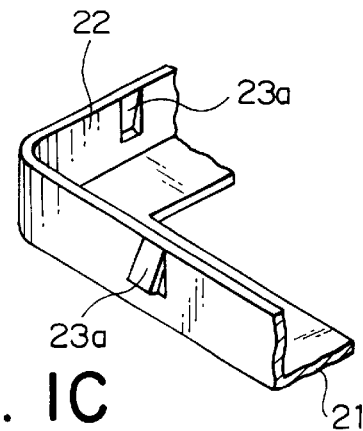
FIGS. 1A and 1B are a perspective view and a cross-sectional view of a sliding roof in accordance with a first embodiment of the present invention, respectively.

A sliding roof according to the present invention will be described with reference to the drawings.

Embodiments shown in FIGS. 1A to 1F are directed to sliding roofs 26a, 26b and 26c in which projections 23a, 23b and 23c are partially provided in raised portions 22 of frames 21, and after glass panels 24 has been attached to the frames 21, weather strips 25 may be mounted on the frames 21. In each of the sliding roofs 26a, 26b and 26c of such assembly type, it is impossible to perform the pull-apart preventing process by clamping the part of the weather strip by the panel 24 and the frame 21 but it is possible to easily assemble the weather strip 25 simply by fitting it from above by adopting the weather strip 25 in which a tongue portion is dispensed with.

Figure 1B:
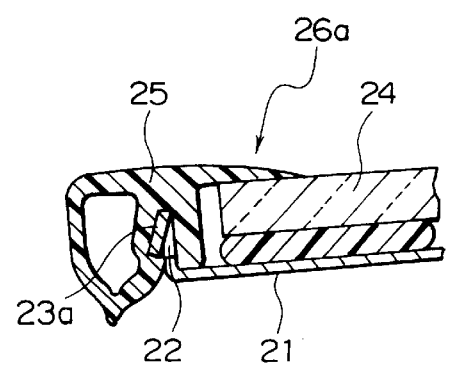

The projection 23a in the pattern shown in FIGS. 1A and 1B has an edge directed to the proximal end side of the raised portion 22 by cutting the raised portion 22 into a U-shape to project the lower edge outwardly.

Figure 1C:
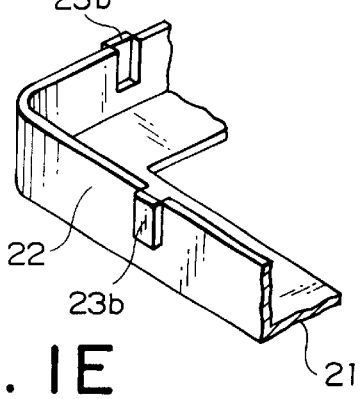
FIGS. 1C and 1D are a perspective view and a cross-sectional view of a sliding roof in accordance with a second embodiment of the present invention, respectively.
Figure 1D:
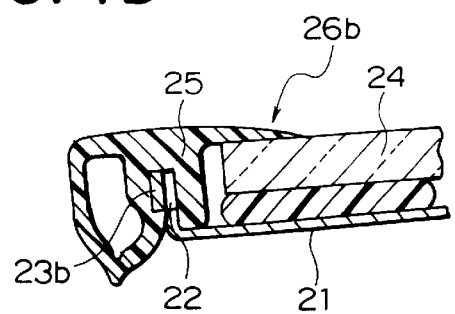

The projection 23b in the pattern shown in FIGS. 1C and 1D has an edge at the entire outer periphery thereof by punching out an upper end portion of the raised portion 22 into a rectangular shape to displace the punched-out portion outwardly.

Figure 1E:
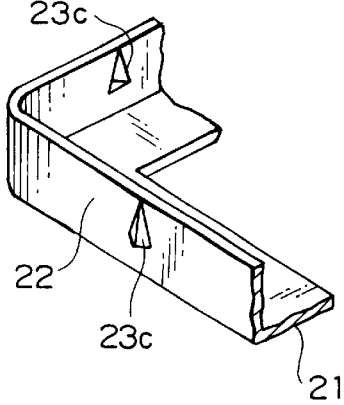
FIGS. 1E and 1F are a perspective view and a cross-sectional view of a sliding roof in accordance with a third embodiment of the present invention, respectively.
Figure 1F:
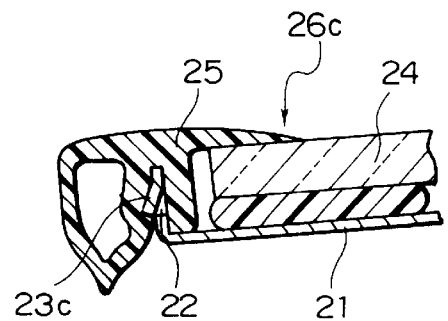

The projection 23c in the pattern shown in FIGS. 1E and 1F has an edge directed to the proximal end side of the raised portion 22 by punching out the raised portion 22 into a triangular conical shape with its apex upwardly.

Thus, in any of the raised portions 22, the raised portion itself is projected outwardly by shearing work, so that each of the projections 23a, 23b and 23c is formed.

Thus, the projections 23a, 23b and 23c are formed by utilizing the shearing work which has a high efficiency, so that the productivity is enhanced and the assembly work is facilitated. Since any projection has the edge directed to the proximal end side of the raised portion, the weather strip 25 that has once fitted will never be removed by the retainer action of the edge.

In addition, since the projection amount of each of the projections 23a, 23b and 23c may be suppressed to much the same level as the plate thickness, the width of the weather strip 25 is not enlarged.

FIGS. 2A to 2D show embodiments of sliding roofs 36a and 36b in which raised portions 32a and 32b of frames 31a and 31b are bend and formed in a two-stage manner over the entire circumferences. In the pattern shown in FIGS. 2A and 2B, the raised portion 32a is provided with a slant portion 32c bent at an angle of 45 degrees to a horizontal portion 31c of the frame 31a and a vertical portion 32d bent at an angle of 45 degrees to the slant portion 32c, i.e., at a right angle with respect to the horizontal portion 31c. Namely, the raised portion 32a is bent by 45 degrees twice to thereby establish a right angle relationship between the vertical portion 32d and the horizontal portion 31c. Then, the entire surface of the slant portion 32c provided over the entire circumference of the raised portion 32a serves as resistance to thereby prevent the pull-apart of the weather strip 25.

Figure 2A:
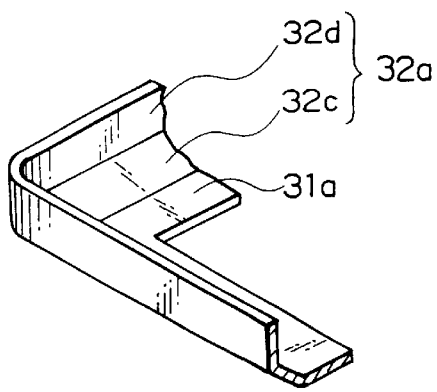
FIGS. 2A and 2B are a perspective view and a cross-sectional view of a sliding roof in accordance with a fourth embodiment of the present invention, respectively.
Figure 2B:
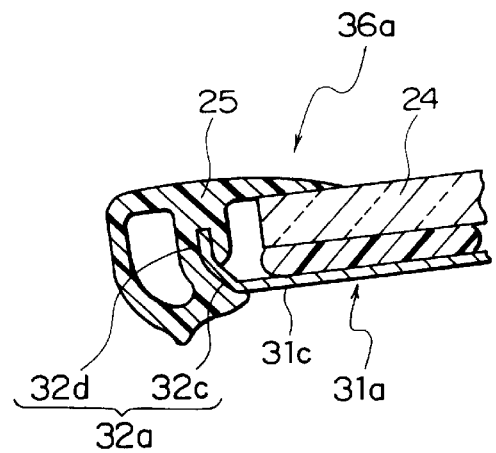
Figure 2C:
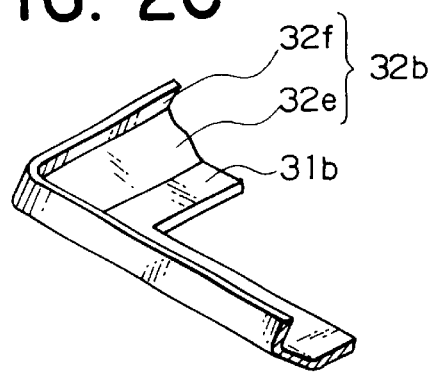
FIGS. 2C and 2D are a perspective view and a cross-sectional view of a sliding roof in accordance with a fifth embodiment of the present invention, respectively.
Figure 2D:
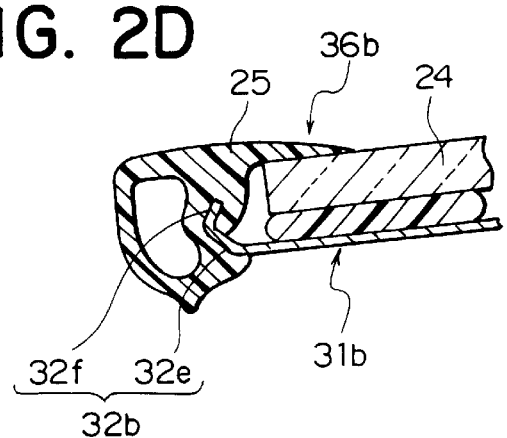

In the pattern shown in FIGS. 2C and 2D, the raised portion 32b is bent twice and formed into a V-shape in cross section, and there is no vertical portion. The pull-apart is prevented by two slant portions 32e and 32f.

In any case, these sliding roofs 36a and 36b may readily be formed by pressing the frames 31a and 31b. Also, there is almost no projection in the raised portion. Accordingly, the width of the weather strip 25 is subjected to almost no affect.

In the foregoing embodiments, the case where the projections are formed in the outer surface of the raised portion and the case where the raised portion is formed in the two-stage manner have been described. However, the sliding roof of the present invention is not limited thereto or thereby. For instance, it is possible to form the projections on the inner surface or to provide the projections on both inside and outside surfaces.

Figure 3A:
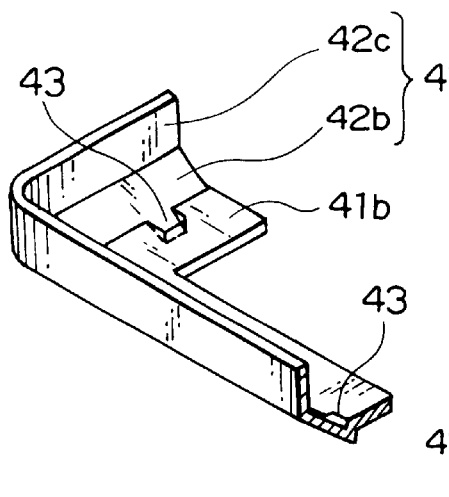
FIGS. 3A and 3B are a perspective view and a cross-sectional view of a sliding roof in accordance with a sixth embodiment of the present invention, respectively.
Figure 3B:
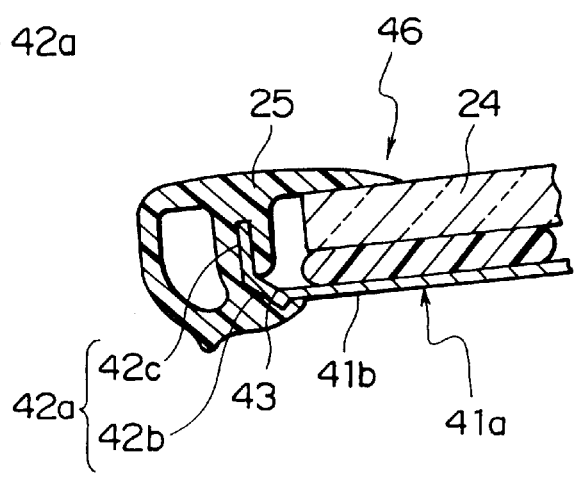
Figure 4:
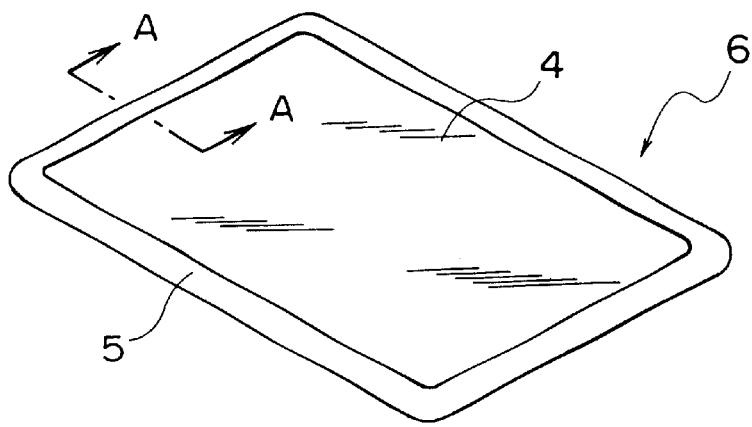
FIG. 4 is a perspective view of a conventional sliding roof.
Figure 5:
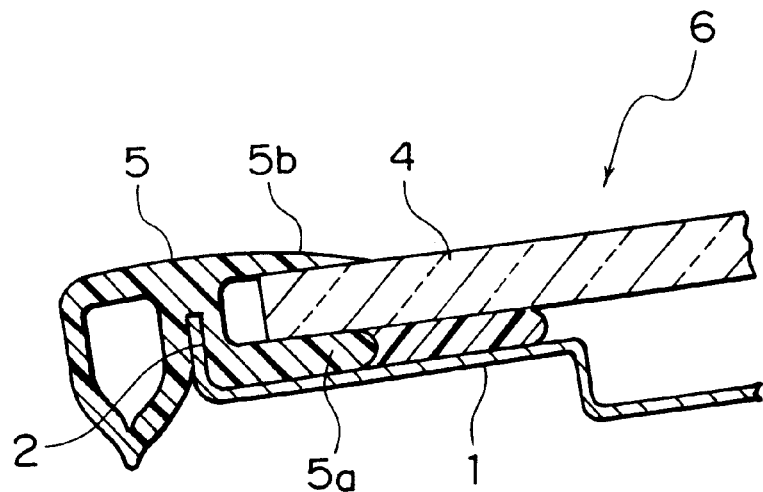
FIG. 5 is a view showing the conventional sliding roof and relating to a cross-section taken along the line A—A of FIG. 4.
Figure 6:
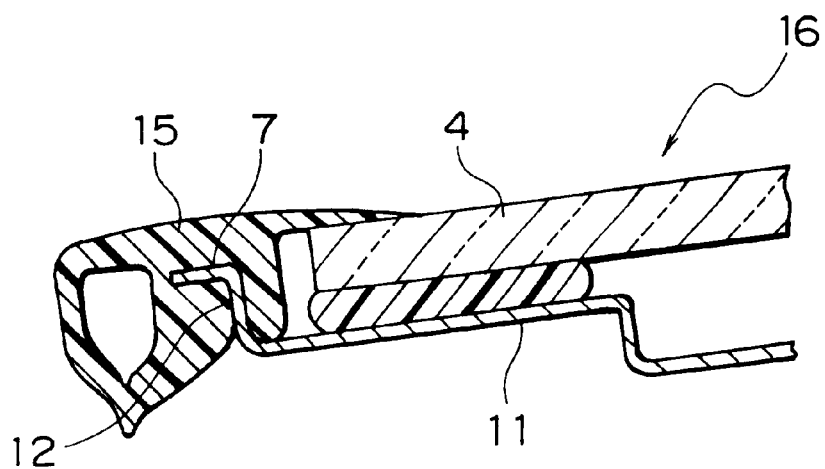
FIG. 6 is a view showing another conventional sliding roof and illustrating the sliding roof in which a pull-apart preventing means for the weather strip that has been considered conventionally is provided in the case where the weather strip may be mounted after assembling work.

Also, it is possible to additionally provide the projections to the raised portion which has been bent in the two-stage manner. Furthermore, as shown in FIGS. 3A and 3B, a raised portion 42a that is provided with a slant portion 42b and a vertical portion 42c which are substantially the same as the slant portion 32c and the vertical portion 32d of the pattern shown in FIGS. 2A and 2B is formed, and a projection 43 may be formed substantially at a border between the slant portion 42b and a horizontal portion 41b of a frame 41a. Also, it is possible to perform the various modifications by combining, for example, change of the shape or position of the projection or change of the bending angle or position of the raised portion that has been thus far described.

Incidentally, the panel may be formed of synthetic resin in addition to the glass. Also, the height of the raised portion or the method of forming the projection is not limited to that shown in the embodiments.

According to the invention, the pull-apart prevention of the weather strip and the enhancement of the assembling workability are compatible without increasing the width of the weather strip simply by affecting the simple work to the frame.

In particular, if the projection is formed by utilizing the shearing work, it is possible to effectively form the edge.

What is claimed is:

1. A sliding roof capable of opening/closing an opening window formed in a roof body, comprising:

a frame having a raised portion around the outer circumference thereof;

a panel attached to the frame; and a weather strip fitted between said raised portion and said panel, said raised portion comprising a triangular-shaped projection with its apex directed upwardly with an edge directed to a base end of said raised portion for preventing said weather strip from being pulled apart.

2. The sliding roof according to claim 1, wherein said projection is formed by shearing work of said raised portion.

* * * * *